United States Patent
Golding et al.

(10) Patent No.: US 7,788,967 B2
(45) Date of Patent: Sep. 7, 2010

(54) METHOD AND APPARATUS FOR LEAK DETECTION

(75) Inventors: Randy D. Golding, Tucson, AZ (US); David Rabb, Tucson, AZ (US); Ken Huey, Tucson, AZ (US)

(73) Assignee: Praxair Technology, Inc., Danbury, CT (US)

( * ) Notice: Subject to any disclaimer, the term of this patent is extended or adjusted under 35 U.S.C. 154(b) by 333 days.

(21) Appl. No.: 12/101,272

(22) Filed: Apr. 11, 2008
(Under 37 CFR 1.47)

(65) Prior Publication Data

US 2009/0113995 A1    May 7, 2009

Related U.S. Application Data

(60) Provisional application No. 60/927,190, filed on May 2, 2007, provisional application No. 60/967,680, filed on Sep. 6, 2007.

(51) Int. Cl.
*G01M 3/04* (2006.01)
*G01M 3/20* (2006.01)
*G01M 3/32* (2006.01)

(52) U.S. Cl. ............ 73/40.5 A; 73/40; 73/40.5 R; 73/49.2

(58) Field of Classification Search ............ 73/40–49.8
See application file for complete search history.

(56) References Cited

U.S. PATENT DOCUMENTS

| | | | |
|---|---|---|---|
| 3,729,983 A | 5/1973 | Coppens | |
| 4,862,731 A | 9/1989 | Gates | |
| 5,072,623 A * | 12/1991 | Hendershot | 73/49.2 |
| 5,076,728 A * | 12/1991 | Golding | 405/129.5 |
| 5,081,864 A * | 1/1992 | Zaim | 73/49.2 |
| 5,117,677 A * | 6/1992 | Hendershot et al. | 73/49.2 |
| 5,184,504 A * | 2/1993 | Spring | 73/49.2 |
| 5,200,615 A | 4/1993 | Hopenfeld | |
| 5,220,823 A | 6/1993 | Berg et al. | |
| 5,279,148 A * | 1/1994 | Brandes | 73/40.5 R |
| 5,309,752 A | 5/1994 | Beckinghausen, Jr. et al. | |
| 5,589,631 A * | 12/1996 | Spring et al. | 73/49.2 |
| 5,922,943 A | 7/1999 | Chapman, IV | |
| 6,289,722 B1 | 9/2001 | Lycan et al. | |
| 6,551,024 B1 * | 4/2003 | Berg et al. | 405/54 |
| 6,886,389 B1 | 5/2005 | Hagar | |
| 7,051,576 B2 | 5/2006 | Huchinson et al. | |
| 7,051,579 B2 * | 5/2006 | Kenney et al. | 73/49.2 |
| 7,461,541 B2 * | 12/2008 | Adams et al. | 73/40.5 R |
| 2005/0252279 A1 * | 11/2005 | Newman | 73/49.5 |
| 2006/0037383 A1 * | 2/2006 | Kenney et al. | 73/49.3 |
| 2008/0072659 A1 * | 3/2008 | Adams et al. | 73/49.2 |

FOREIGN PATENT DOCUMENTS

| | | |
|---|---|---|
| AU | 676015 | 3/1995 |
| EP | 1014069 | 6/2000 |
| JP | 2002250669 | 9/2002 |

\* cited by examiner

*Primary Examiner*—David A. Rogers
(74) *Attorney, Agent, or Firm*—Salvatore P. Pace (57) ABSTRACT

Methods and apparatuses are disclosed for detecting small leaks in double wall containers using enhanced tracer dispersal and detection techniques. More specifically, economical, substantially closed leak detection apparatuses, methods and systems are disclosed that conserve interstitial fluid between container walls enhancing the duration and sensitivity of leak detection testing.

51 Claims, 6 Drawing Sheets

FIG. 6

METHOD AND APPARATUS FOR LEAK DETECTION

RELATED APPLICATIONS

This application claims the benefit of U.S. Provisional Application Ser. No. 60/927,190, filed on May 2, 2007; and U.S. Provisional Application Ser. No. 60/967,680, filed on Sep. 6, 2007, both of which are incorporated herein by reference.

FIELD OF THE INVENTION

The present invention is directed generally to the detection of leaks in containers and conduits. More specifically, the present invention is directed to the methods and apparatuses used to detect leaks in double wall containers and conduits, such leaks being as small as 0.005 cc/sec.

BACKGROUND

Many tanks and pipes are of double wall construction. The inner wall provides primary containment and the outer wall provides secondary containment. The space between the walls is referred to equivalently as the annular space, annulus, interstitial space, interstice or secondary containment space.

Various approaches of leak detection methods have been applied to testing the integrity of primary and/or secondary walls. The interstitial space can be put under pressure or vacuum and the pressure may be monitored as an indicator of leakage. Further, the interstitial space can be monitored for liquids that might leak from the primary containment. Still further, the interstice can be filled with liquid and the liquid level monitored as an indicator of leakage.

However, there are shortcomings to each known approach. For example, the current practices of testing the integrity of the interstitial space using pressure or vacuum decay are not able detect leaks as small as of 0.005 cc/sec (or gal/h).

The practice of monitoring the interstitial space for the presence of a liquid does not evaluate the integrity of the secondary wall (unless the tank is submerged in liquid). Additionally, the containment must be filled with liquid before monitoring can begin. If the secondary containment is leaking, fluid may be released before reaching the interstitial liquid monitor.

It is also known to add a unique chemical tracer to one side of a barrier and to test and/or monitor for the tracer on the other side of the barrier. Conceptually, a tracer or vapor mixture could be added to the primary containment, and detected in the interstice and/or the tracer could be added to the interstice and detected inside the primary containment and/or outside the secondary containment. However, in practice, the tracer must diffuse, a relatively slow process over significant distances, or be transported by fluid flow or convection between any possible leak location and the sampling location.

Further, it is known in manufacturing processes to introduce a tracer chemical into a primary container and test for a tracer chemical in a secondary container. The secondary container may be flushed or evacuated in order to transport any tracer released by a leak to the detector. However, in practice, this method involves containers of limited size (less the 200 liters) for the purpose of leak detection. In addition, the distances involved usually allow for rapid transport of the tracer to the detector. Such methods are not scalable for larger containers necessarily having large dimensions and therefore larger distances (more than a few feet), such as, for example, large double wall containers (greater than about 1000 liters) that may be built with large distances between the leak location and a single interstitial access.

It is also known to add a tracer to the annular space of a double wall container surrounding the primary chamber and test for the tracer inside a primary chamber. The tracer mixture is added to one end of the annular space and flushed through to an opening at the other end until the tracer mixture is present throughout the annulus. The pressure differential between the annulus and the primary chamber causes fluid to flow from the annulus to the primary chamber in the event of a leak.

It is known to rely on diffusion to transport the tracer throughout the interstitial space. If a tracer is added to the primary containment and the primary containment is pressurized, any fluid which leaks into the interstice will be transported into the interstice. The period between the addition of the tracer to the primary containment and the collection of the test sample is dictated by the rate of diffusion of the tracer and the distance.

The addition of tracer to the annulus and the subsequent distribution of the tracer may also rely on diffusion, but the time requirement is greater than for detection of leakage of the tracer to the interstice, because the tracer mixture in the interstice must relatively evenly distributed throughout the annulus.

A reliable leak detection method for larger containers with double walls, wherein even low-level leaks (as small as 0.005 cc/sec) are detected quickly, would be highly advantageous.

SUMMARY OF THE INVENTION

One embodiment of the present invention is directed to increasing the sensitivity of tests allowed by tracer methods over pressure, vacuum decay or hydrostatic decay tests, and shortening the time required for dispersion of the tracer by actively dispersing the tracer. In addition, according to one embodiment, the present invention more efficiently disburses the tracer than was presently known.

More specifically, in one embodiment, the present invention is directed to a method for detecting the permeable integrity of, including leaks in, a container having a plurality of walls comprising the steps of providing a container having a plurality of chambers with at least a second chamber substantially surrounding a first chamber, each chamber having chamber walls thus creating an interstitial space between the walls of the first and second chambers. A tracer source is provided in communication with the first or second chamber. A filling and evacuation system is provided in communication with said second chamber, comprising a sampling port and a containment means for fluid evacuated from the second chamber, and, consequently the interstitial space between the two chambers. A flow of tracer is directed from the tracer source into the first or second chamber. At least the second chamber is then subjected to repeated pressure changes during filling and evacuation cycles via the filling and evacuation system, thus directing fluid flow from an interstitial space through the filling and evacuation system to a collection means and sampling means. This fluid is redirected from the collection means back to the interstitial space during a filling cycle. Once the tracer has been adequately dispersed during the repeated filling and evacuation cycles the fluid from the interstitial space is sampled from a sampling port and evaluated for the presence of tracer material, evidencing a leak in a chamber wall. The leak may be detected having a flow rate as low as from about $10^{-7}$ cc/sec to about 1 cc/sec, and typically to a flow rate of less than about 0.005 cc/sec.

In a further embodiment, the present invention is directed to a method for detecting the permeable integrity of a container having a plurality of walls comprising the steps of providing a container having a plurality of chambers with at least a second chamber substantially surrounding a first chamber, each chamber having chamber walls thus creating an interstitial space between the walls of the first and second chambers and providing a tracer source in communication with said second chamber. A filling and evacuation system is provided in communication with said second chamber, said filling and evacuation system comprising a sampling port and a contained means for fluid evacuated from the second container. A remote detection and sampling means is provided located proximate to the container exterior to the second chamber wall and/or within the first chamber. A flow of tracer is directed from the tracer source into the second chamber. At least the second chamber is then subjected to repeated pressure changes during filling and evacuation cycles via the filling and evacuation system whereby fluid flow is directed from an interstitial space through the filling and evacuation system to a collection means and redirecting the fluid from the collection means to the interstitial space during a filling cycle. Fluid exterior to the second chamber wall and/or first chamber is then sampled from a sampling port at the sampling means and evaluated for the presence of tracer evidencing a leak in a wall of the first and/or second chamber.

BRIEF DESCRIPTION OF THE DRAWINGS

Other objects, features, embodiments and advantages will occur to those skilled in the art from the following description of preferred embodiments and the accompanying drawings, in which.

DETAILED DESCRIPTION OF THE INVENTION

According to one embodiment of the present invention, fluid is removed from, and returned to, the interstice of a double wall container. A fluid is understood to be a liquid, gas or mixture of vapors and gases. The interstice is the space between the walls of the double wall container. The purpose of fluid removal and return is to rapidly disperse, or mix, a tracer throughout the fluid in the interstice or the interstitial space between the walls. A tracer is a unique component that may contain an amount of traceable radioactive material, or may be a chemical concentrate that may be added to a container and used as a label to track the flow of the contents. One application of such tracers is to detect leaks. According to methods and systems of the present invention, the flow of very small amounts of fluid from one side of a barrier to another side (on the order of from about $10^{-7}$ cc/sec to about 1 cc/sec) can be revealed by the detection of a tracer.

The storage space of the container is called the primary chamber. According to one embodiment of the present invention, the tracer can be placed in the primary containment. Leaks occurring through the primary wall to the interstice tracer will be detected in samples collected from the interstice. According to other embodiments of the present invention, the tracer can be added to the interstice, and if a leak exists in the primary or secondary wall, the tracer will be present in samples collected from the primary containment or outside the secondary wall. According to a first embodiment of the present invention, the proper, useful, addition of tracer to the interstice requires that the tracer be dispersed throughout the interstice. According to one embodiment of the present invention, the collection of a sample from the interstice requires that a portion of the tracer mixture that leaks to the interstice be transported to the interstitial access port. Therefore, one aspect of the present invention relates to the movement of the tracer mixture within the interstice. It is the unique movement of the interstitial fluid in and out of the interstice that rapidly and reliably disperses the tracer throughout the interstice to the detection site.

Therefore, according to one embodiment, methods of the present invention use leak indicating tracers or chemicals to test for leaks through the primary and/or secondary wall. A leak-indicating tracer or chemical can be added to the primary chamber, the interstitial fluid sampled, and the samples tested for the presence of the tracer. In another embodiment, the tracer may be added to the interstitial space, and samples may be collected from inside the primary containment and/or outside the secondary containment and tested for the presence of the tracer.

Access to the interstitial space is often limited to one port. In using a tracer to test the integrity of the primary wall by collecting samples from the interstitial space, the test period must be long enough for the tracer to migrate through the interstice from the farthest potential leak location to the access port or convection. Because of the long period of time required for the tracer to diffuse this distance, a shorter test period requires that a flow be induced in the interstice so that the tracer can be transported to the access port.

There are several approaches for causing the dispersal of the interstitial fluid with a chemical tracer label. For example, nearly all the fluid (e.g. gases, liquids, vapors, or any combination thereof) may be removed or evacuated from the interstice in order to collect a sample. According to the present invention, the fluid returned to starting pressure or above can include a tracer mixture. To assure that the tracer is fully dispersed in the interstitial fluid, the removal/return cycle can be repeated, as part of the fluid in the interstice may be removed from and returned to the interstice space. Partial removal of the interstitial fluid causes the remaining fluid to flow and fill the void created in the interstitial space. This increases the dispersion of any tracer that may have leaked into the interstice. The fluid that was removed from the interstice may be put back into the interstice or may be replaced by fluid from the atmosphere or another container, such as a storage container for a liquid or a compressed cylinder for a gas. Each repetition of this cycle further disperses the tracer. After a sufficient number of cycles, the tracer can be detected at the access/sampling port Fluid can be added to the interstice, compressing the tracer-labeled gas or changing the level of tracer-labeled liquid in the interstice. Venting or releasing the fluid from the interstice, allows the tracer-labeled fluid to disperse away from the leak or injection point. Adding pressure and venting the added interstitial fluid continues to disperse the tracer throughout the interstitial space.

Replacing the fluid that was withdrawn provides several benefits. Such fluid replacement prevents infusion of leak-indicating tracer that may be present outside the system from other leaks or vents. Such fluid replacement further provides an opportunity to measure the volume of the interstice by comparing the volume removed to the pressure change. In addition, the fluid replacement more efficiently accomplishes the dispersion of the tracer throughout the interstice, because the fluid that is put back into the interstice contains substantially all the leak-indicating tracer that might be present in the fluid that was removed. It is not necessary to collect the fluid removed from the interstice, although this improves the practice. It is also not necessary to provide a vacuum, although this is generally the most efficient, most generally applicable, and safest approach. This is especially true when the fluid removed and returned to the interstice is a gas or vapor.

The methods of the present invention are also useful in detecting abnormalities (e.g. leaks or other defects, etc.) that may result in leaks in the secondary wall of a double wall containment system. In order to test the secondary wall, according to methods of the present invention, it is necessary to add a leak indicating tracer to the interstitial space. This can be done by removing substantially all the fluid from the interstice and replacing it with a tracer mixture. It may also be accomplished by removing a portion of the interstitial fluid and replacing it with a tracer mixture. Repeating the cycles of removing part of the interstitial fluid and then returning it to the secondary containment disperses the tracer mixture throughout the interstitial space.

Collecting the fluid that was evacuated from the interstitial space, and returning that same fluid to the interstitial space during the addition of leak indicating tracer provides additional benefits. Preferably, the amount of fluid that needs to be added to the interstice is present in a collection device before the tracer is added. The tracer is dispersed more efficiently because the tracer is always present in the fluid that is returned to the interstice. Tracer mixture that is removed from the interstice is contained in the collection device. Therefore, the potential for releasing test tracer during the addition step is minimized. This is especially true for gaseous tracers.

If there is a leak in the secondary wall, the tracer mixture will leak to the exterior of the tank. According to methods of the present invention, the leak may be detected by sampling outside the tank. If the tank is buried, samples are collected from tubes that provide access to the adjacent backfill. By contrast, if there is a leak in the primary wall, tracer will leak from the interstitial space to the primary containment. In this case the leak may be detected by collecting samples from the primary containment.

Large double wall containers (greater than about 1000 of liters) may be built with large distances between the leak location and a single interstitial access. Some of the improvements of this invention over existing methods include: 1) increasing the sensitivity of tests allowed by tracer methods over pressure, vacuum decay or hydrostatic decay tests, and 2) reducing the time required for dispersion of the tracer by actively dispersing the tracer from at least the point of the occurrence of any leak to the sampling feature or port.

As stated above, embodiments of the present invention are directed to methods that more quickly enable the detection of much smaller leaks than known technologies. In such known technologies, pressure or vacuum decay methods are limited by settling times (pressure equilibrating from one portion of the UST to another), temperature fluctuations, barometric pressure fluctuations and gauges having low resolution. Presently known methods also find it difficult to discern whether the primary or secondary wall is leaking, or whether both walls are leaking. According to the present invention, by dispersing tracer that leaks, for example, from the primary to the interstice, small leaks are detectable in a short time. Further, by dispersing tracer that is injected into the interstice, only leaks from the outer wall are detected outside the tank.

The present invention has significant advantages over known tracer methods. According to preferred embodiments, systems according to the present invention disperse the tracer gas in the interstice, greatly reducing the waiting period during testing. An additional advantage provides for collection of the fluid removed from the interstice (particularly if the fluid is a gas or if the tracer is a volatile chemical). This allows the same fluid to be returned to the interstice. Inclusion tracers released at the test site by other leaks or operations is avoided. The potential time for detecting tracer vented from the interstice when testing the external wall is also significantly reduced. Detecting small leaks in a short time decreases associated test costs such as service time for the test crew, remobilization to the test facility, standby time or repeat trips for maintenance service personnel and delayed use of the facility for its intended economic benefit.

Further, detecting small leaks, at the first instance and in a short time, prevents repeated failures of long term monitoring methods that will eventually detect a small leak. Detecting small leaks before they have the opportunity to release unwelcome substances to the exterior of the container reduces the future costs associated with removing them from the soil or interstice.

Figure 1:
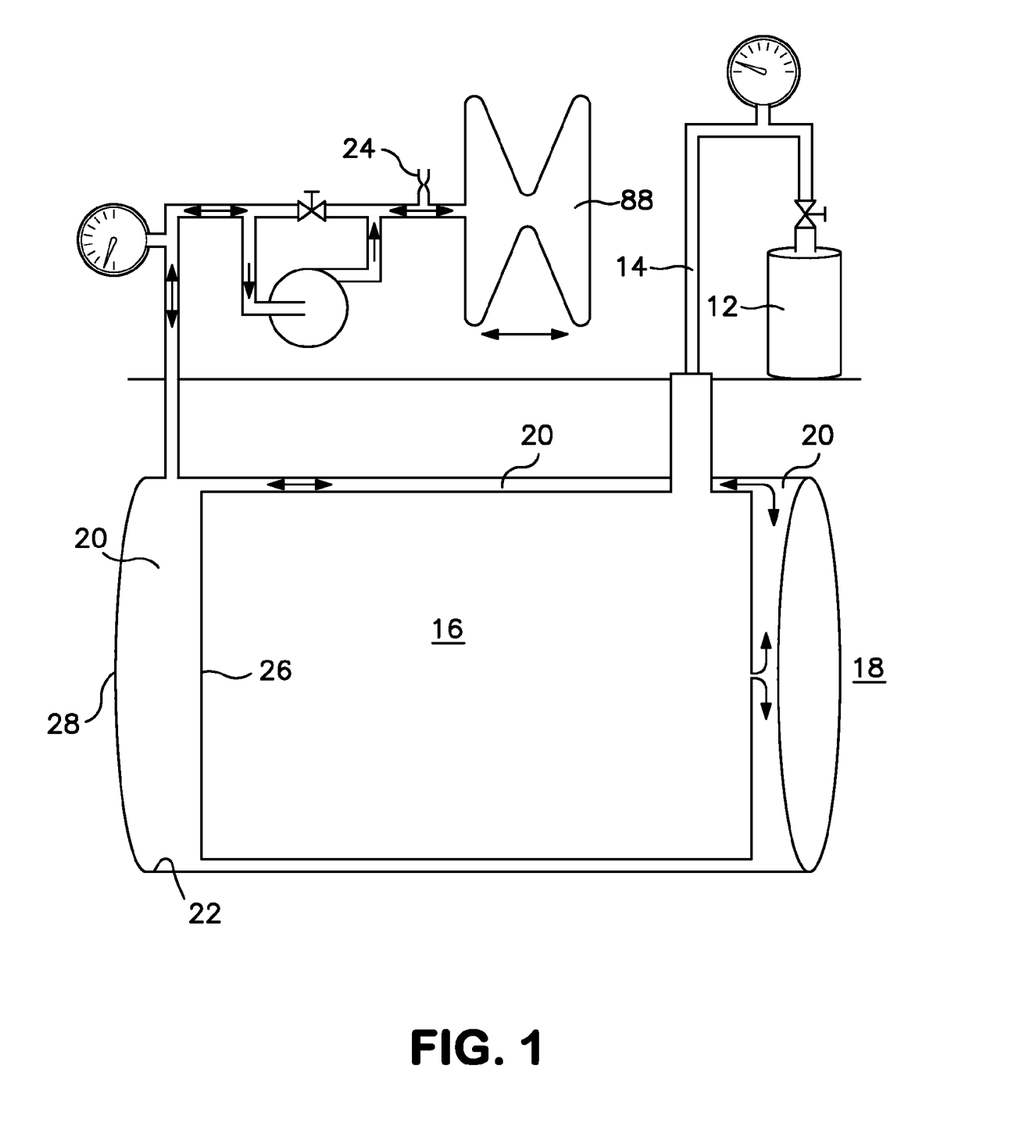
FIG. 1 is a schematic representation of one embodiment of the present invention showing sampling taken from an interstitial space.

In one preferred embodiment, the methods of the present invention find particular utility in tightness testing double wall containers with fluid filled interstitial spaces. A common example of such a container is double wall underground storage tank. As shown in FIG. 1, leaks are detected by adding a tracer chemical, that may be a liquid or vapor from a tracer gas source 12, via a pathway 14 into the primary containment 16 inside a double wall container 18 and detecting the tracer in the interstitial space 20 between the primary containment 16 and the secondary containment 22. The tracer that leaks into the secondary containment 22 from the primary containment 16 during the initial waiting period of the test is actively dispersed throughout the interstitial space 20 by removing fluid from and returning fluid to the interstitial space (interstice) 20. After a few cycles, a sample of fluid from the interstitial space 20 is collected at the access port between the pump and the collapsible container (not shown) and tested for the presence of the tracer.

Tracer mixture from the tracer source 12 is also added to the interstitial space by actively withdrawing and replacing interstitial fluid present within the interstitial space 20. Adding tracer to the return line helps disperse the tracer mixture throughout the interstice. After a few cycles, the tracer is evenly distributed throughout the interstice.

Extra fluid may be added to the interstice and vented back to atmospheric pressure. The addition of, and release of, fluid to the interstice disperses tracer that may have leaked into the interstice so that it may be detected, and also allows for the dispersion of a tracer-labeled mixture for testing both walls (primary containment walls 26 and secondary containment walls 28) of the interstitial space 20.

Figure 2:
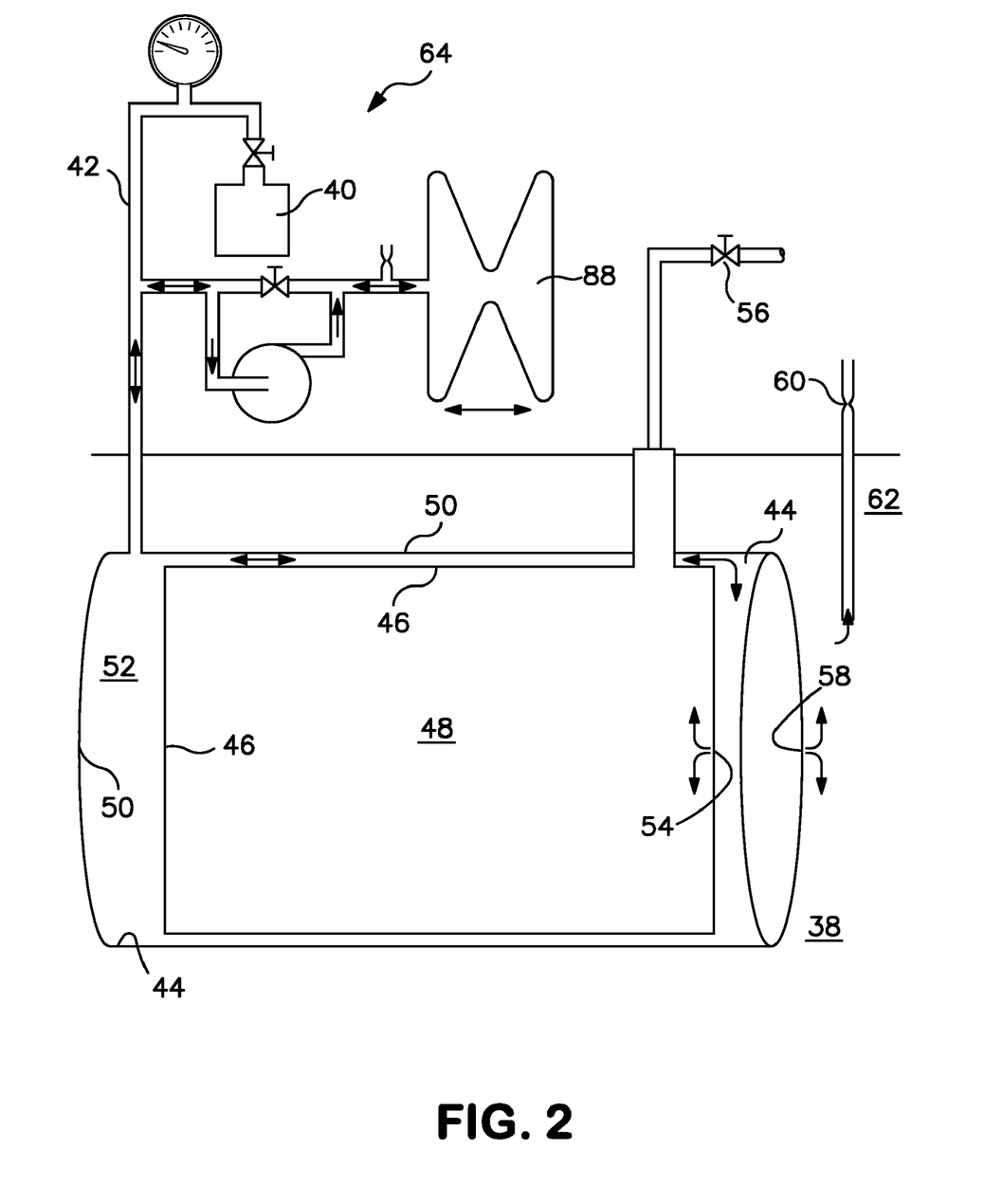
FIG. 2 is a schematic representation of one embodiment of the present invention showing sampling taken from the primary containment.

FIG. 2 shows a method for adding tracer to the interstitial space between a double-walled containment system 38 for purposes of detecting a leak in the primary and/or secondary containment walls. In this configuration, according to one embodiment of the present invention, tracer is added to the system from a tracer source 40 through a pathway 42 into the interstitial space 44 between the primary wall 46 of a primary containment chamber 48 and the secondary wall 50 of a secondary containment chamber 52. A leak 54 in the primary wall 46 is detected as tracer enters the primary containment chamber 48 through the primary sample port 56. Similarly, a leak in the secondary wall 58 is detected via an external sample port 60 located proximate to the containment system in backfill 62.

Figure 3:
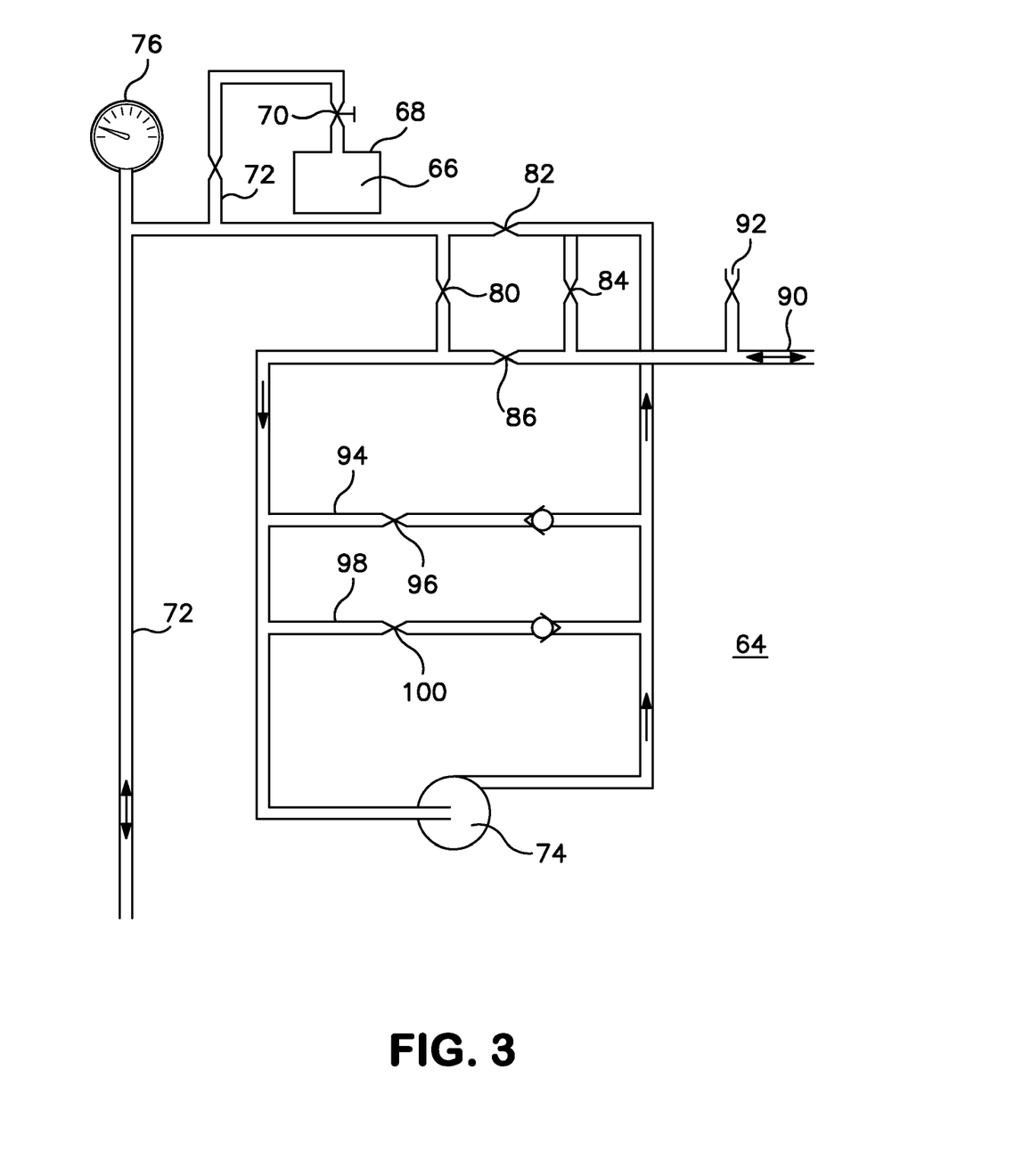
FIG. 3 is a schematic representation showing the reversible flow pumping and sampling segment of the system shown in FIG. 1.

One embodiment of the tracer cycling and collection array 64 is shown in enhanced detail in FIG. 3. During the tracer release cycle, tracer 66 is provided from a tracer source 68 past valve 70 in the open position along pathway 72 and into the interstitial space between the primary and secondary containment. The array 64 is pressurized (positive pressure during the interstitial space filling cycle/negative pressure during the interstitial space voiding cycle) via pump 74 and monitored via gauge 76. The valves 80, 82, 84 and 86 are triggered into their desired open/closed positions depending on the cycle involved. During the interstitial space voiding cycle, fluid from the interstitial space is directed back through the cycling array 64 and into a container (88 shown in FIGS. 1 and 2, but not shown in FIG. 3) via pathway 90. The container is preferably a collapsible, flexible container capable of repeated filling and emptying cycles. FIG. 3 also shows a tracer sampling port 92 within cycling array 64, and pressure relief line 94 having pressure relief valve 96, and vacuum relief line 98 with vacuum relief valve 100.

Figure 4A:
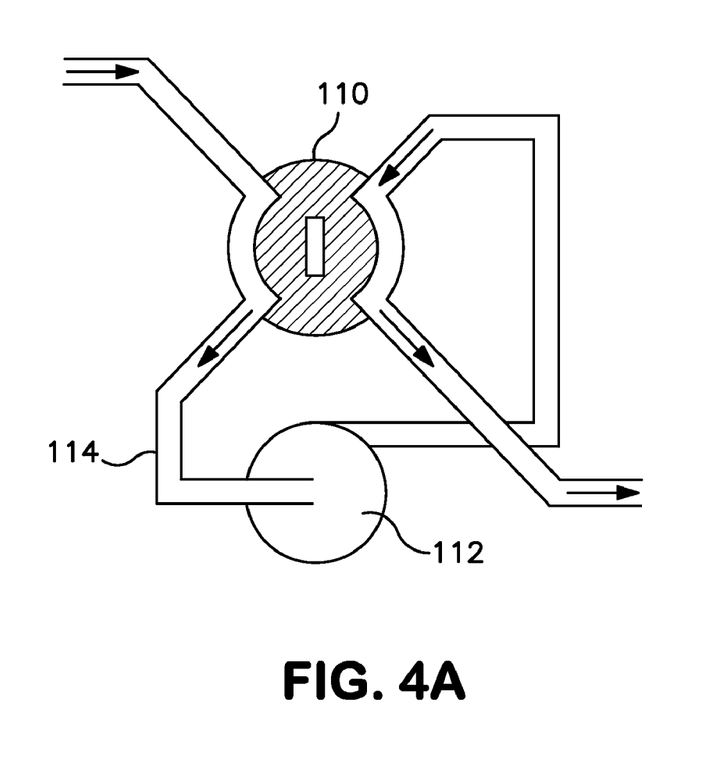
FIGS. 4a and 4b are schematic representations showing the first and second valve positions respectively, as shown in FIGS. 1 and 2.
Figure 4B:
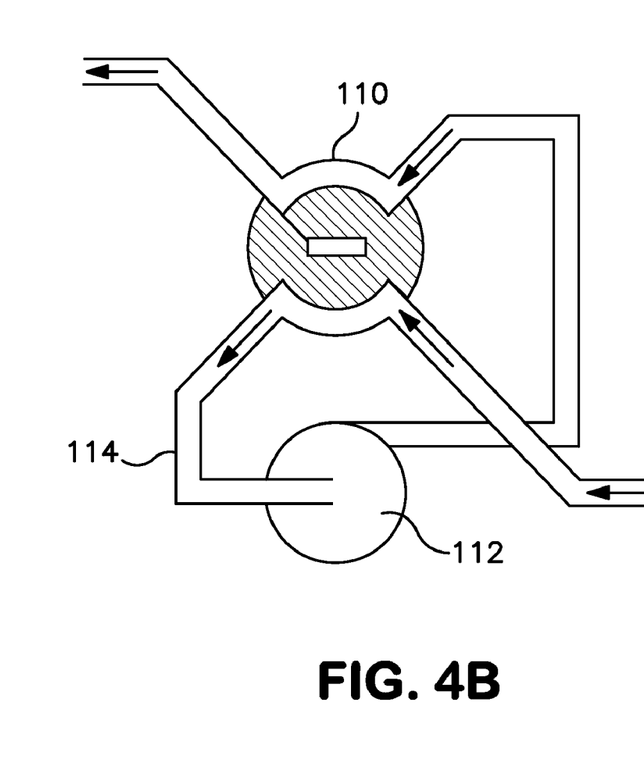

FIGS. 4A and 4B show the cross-sectional operation of a valve 110 and pump 112 in the pathway 114 during voiding and refilling cycles respectively. In FIG. 4A, valve 110 is placed into position, such that the flow effected by pump 112 removes fluid (potentially with tracer) from the interstitial space (not shown) and sends the flow to a collapsible container (not shown). In FIG. 4B, the valve is positioned such that the flow effected by pump 112 sends fluid (potentially with tracer) from the collapsible container (not shown) to the interstitial space (also not shown).

Figure 5:
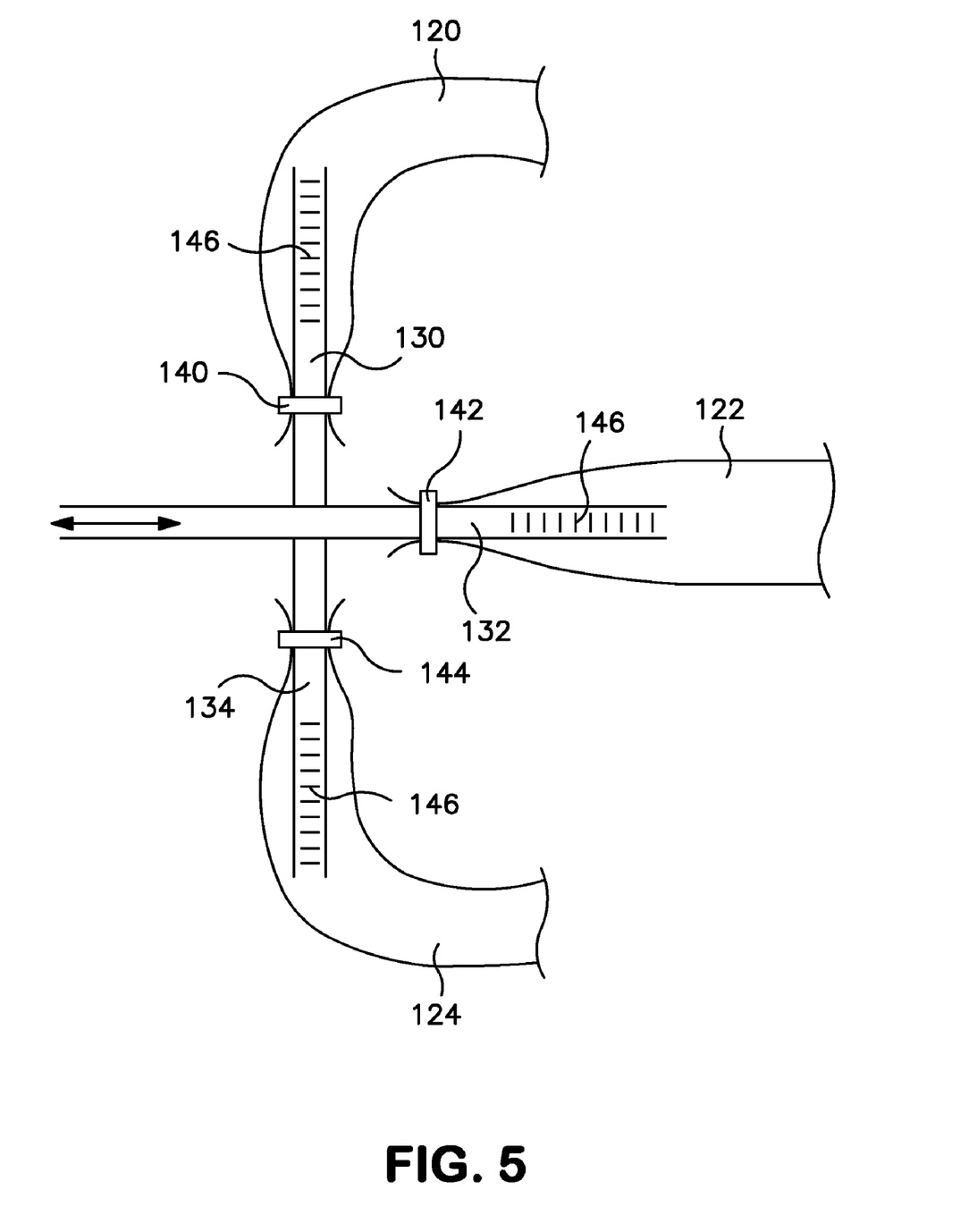
FIG. 5 is a schematic representation showing the connections to the collapsible container and to the pump as shown in FIGS. 1 and 2.

FIG. 5 shows a schematic representation of the connection of the ends of the collapsible containers 120, 122, 124 to manifolds 130, 132, 134, respectively, and held in place with clamps 140, 142, 144, respectively. The manifolds are understood to facilitate reversible fluid flow from the interstitial space to the collapsible containers and vice versa. The collapsible container, or other collection device, preferably includes a collapsible container. An example of a useful container is a flexible or semi-rigid plastic bag, such as, for example, a preferred trash can liner, although a more rigid container is also contemplated. As shown in FIG. 5, a section of the manifold piping (preferably PVC) is perforated (such as, for example, slotted) in order to provide multiple paths from the container back into the interstice and collapsible container(s). Upon flow reversal, the fluid flows from the container to the interstice. The slots or perforations 146 provide multiple paths into the return piping and prevent the collapsible container from plugging the inlets to the pipe.

In one preferred embodiment of the present invention, containment systems of intermediate size, (from about 1000 liters to about 200,000 liters or more), involve the collection of the interstitial fluid that is actively cycled into and out of the interstice, and into, for example, a collapsible container. The collection of the fluid is not necessary to the practice of the invention, but provides additional benefits beyond the dispersion of the mixture in the interstice, some of which are discussed above.

According to one embodiment of the present invention, for detecting leaks in the primary wall of a double-walled container a collection device (comprising a collapsible container), a detection means is connected to an interstitial access port. The collection device comprises a network of piping, tubing, connections, valves a pump, and a collapsible container. The device collects the fluid that is removed from the interstitial space into a collapsible container. During a refilling cycle, the switching of a valve allows the fluid in the collection device to flow back into the interstice. Alternate configurations of the air collection device allow different modes of returning the removed fluid to the interstice. For example, fluid can be allowed to return to the interstice by opening a valve in a line that bypasses the pump. Further, a separate pump can be used to pump fluid back into the interstice. Still further, a configuration of valves can be used to pump the fluid back into the interstice using the evacuation pump, or a single multi-port valve may be used to reverse the direction of fluid flow. The inclusion of check valves in separate bypasses controlled by pressure relief valves prevents over-evacuation or over-pressurization of the vessel.

Fluid is then removed from the interstitial space and the evacuated contents are collected in a collapsible container. The interstitial fluid that was evacuated from the interstitial space is then analyzed for the presence of the tracer fluid. The amount of interstitial fluid that must be evacuated, and the number of cycles through which fluid must be removed and returned are determined from the geometry of the tank. The pressure change in the interstice, and the volume of air in the container is monitored to confirm the volume of the interstice and to check for gross leaks. During the interstitial space "refilling cycle" the evacuated fluid is returned to the interstice. An excess of fluid during return may indicate a leak.

Tracer fluid is added to the gas mixture, and then to the primary containment. The pressure is brought up to testing pressure by adding the required amount of an inert fluid. The amount of tracer added to the primary containment and the appropriate waiting period before samples are collected, are based upon the target leak rate, the detectable concentration of tracer in the sample fluid, the volume of the container to which tracer fluid will be added, and the volume of the container from which the sample will be collected. After an appropriate waiting period (e.g. from about 1 to about 100 minutes, etc.), fluid is removed from the interstice until the internal pressure is from about 5 to about 10 inches of mercury below atmospheric pressure. At this point, a sample may be optionally collected from the sample port. Fluid is then returned from the collapsible container to the interstice. The collection and refilling cycles are repeated a number of times, with the number of cycles determined from the tank geometry (e.g. about 4 times the aspect ratio—defined as length/diameter), for a tank with a large number of mixing spaces, up to 15 times the aspect ration for a tank without mixing spaces, i.e. parallel walls having minimal separation). A sample of the interstitial fluid is collected from the interstitial collection/sampling port and tested for the presence of the tracer. If the tracer is detected, the samples collected previously are also analyzed (if they were collected).

One particularly preferred embodiment of the present invention involves the following steps for testing the primary wall of the container by configuring a way to collect samples from the exterior of the secondary containment. If the containment is buried, pipes are installed into the backfill to allow the collection of the vapor or fluid in the backfill. If the containment is not buried, it is desirably wrapped or placed in an enclosure. The dispersion device is connected in communication with the interstitial access port (See FIG. 2). The configuration of the device includes a connection between a tracer fluid container and the evacuation/return line. There is preferably a means for pressurizing the interstice, using fluid from a compressed cylinder or a pump that is able to pump extra fluid from the collapsible container to the interstice. The device collects the fluid that is removed to a collapsible container (See FIG. 5). The switching of a valve allows the fluid in the collection device to flow back into the interstice (See FIG. 3). Alternate configurations of the air collection device allow different modes of returning the evacuated fluid to the interstice. Fluid is allowed to return to the interstice by opening a valve in a line that bypasses the pump (See FIG. 1). Optionally, a separate pump can be used to pump fluid back into the interstice. A configuration of valves is used to pump the fluid back into the interstice using the evacuation pump (FIG. 3). A single multi-port valve may be used to reverse the direction of fluid flow (See FIG. 4). The inclusion of check valves in separate bypasses controlled by pressure relief valves prevents over-evacuation or over-pressurization of the vessel (See FIG. 3). Fluid is removed from the interstitial space, and collected as evacuated air to a collapsible container. The amount of interstitial fluid that must be evacuated, and the number of cycles through which fluid must be removed and returned are determined from the geometry of the tank (e.g. about 3 times the aspect ratio, length/diameter, for a tank with a large number of mixing spaces, up to 15 times the aspect ratio for a tank without mixing spaces). The pressure change in the interstice is recorded, along with the volume of air in the container, to confirm the volume of the interstice, and to check for gross leaks. The volume of fluid evacuated from the interstice and the volume of the fluid returned to the interstice are recorded to determine whether all the fluid returns. Leftover fluid may indicate a leak. Fluid is removed from the interstice until the internal pressure is preferably 5 to 10 inches of mercury below atmospheric pressure. Tracer mixture is added to the return line and flushed into the interstice by returning the evacuated fluid to the interstice. The amount of tracer added to the interstice and the appropriate waiting period before samples are collected from the primary containment, are based upon the target leak rate, the detectable concentration of tracer in the sample fluid, the volume of the container to which tracer will be added, and the volume of the container from which the sample will be collected. The interstice is brought up to test pressure by adding the required amount of fluid. This may be added from a compressed cylinder or from the pump. The appropriate and determined "wait time/period" is observed.

If the container is buried, samples must be collected from the backfill to test the secondary wall. The waiting period between the addition of tracer to the interstice and the collection of samples is determined by the migration rate of a surrogate tracer. Fluid is returned from the collapsible container to the interstice. The removal/return cycles are repeated through the number of cycles determined from the tank geometry. Samples of the interstitial fluid are collected and the concentration of the tracer is measured to confirm that the concentration is at, or close to expected or estimated levels. The dilution of the tracer into the interstice can be tracked by collecting interstitial sample before and after each evacuation event.

The methods of the present invention can be practiced on a containment apparatus that is above the ground or below the ground. An above ground structure includes, for example, a container or tank that is intended for burial (an underground storage tank) prior to shipping, installation, or between the floors of an aboveground storage tank that has a double bottom.

Fluid withdrawal and replacement is also applicable to interstitial spaces that are partly filled or completely filled with liquids. The liquid must be removed and replaced (or returned) or it may be added, removed and returned. Liquid that is intended to be present only in the primary containment, may be present in the interstice. In order to confirm that it is present due to a leak or to help determine where the leak is, this liquid may be cycled in and out of the interstice as a means of dispersing tracer leaked into or added to the interstice. Liquid added to the interstice for the purpose of monitoring the integrity of both containment walls may be added to, and withdrawn from, the interstice in order to disperse tracer throughout the liquid filled interstice, as this tracer may have been leaked into or added to the interstice.

Not all structures will tolerate the pressure differences described in the best mode. The method can be practiced by evacuating less fluid (pumped to a lesser vacuum or pressure level) than called for in the best mode described above. A reduction in the amount of fluid recycled, requires an increase in the number of cycles for distributing the leaked or added tracer evenly enough. An increase in the fraction of fluid removed, decreases the number of required cycles. Some structures will withstand a full atmosphere of vacuum. If nearly all the fluid in a volume is removed, the pressure difference will be limited by atmospheric pressure. As the internal pressure approaches zero (an absolute pressure of zero is not attainable) the pressure difference approaches atmospheric pressure. For engineering purposes, stresses are proportionate to the pressure difference. In addition, if more than 95% of the fluid can be removed from the interstice, only one removal/return cycle is required.

As an added measure of safety for the testing, an additional bypass is provided around the pump (See FIG. 3). Flow through the bypass is controlled by a pressure relief valve 96. Whenever the pressure between the inlet and outlet of the pump is exceeded, fluid is circulated through the pump and is no longer removed from the interstice or added to the collection device.

A non-exhaustive list of the typical types of underground storage tanks that can be tested with this practice include, for example, double wall (DW) fiber reinforced plastic (FRP or fiberglass), DW steel tanks for which both walls are steel (double wall double steel or DW DS) and DW FRP jacketed steel tanks jacketed steel). Tolerable interstitial vacuums for DW FRP tanks vary from about 0.5 to about 1 atmosphere. Tolerable interstitial vacuums for DW DS tanks vary from about 0.2 to about 0.3 atmospheres. Tolerable interstitial vacuums for jacketed tanks vary from about 0.2 to about 1 atmosphere.

The methods of the present invention can also be applied to single wall containers. Procedurally and conceptually, the primary containment can be treated as the interstice. Any confining barrier that isolates the outer wall of the container from the wind, allows the accumulation of leaking tracer in a way that allows for small leaks to be detected. This includes a building, a cover, soil or backfill. Adding and withdrawing fluid to the primary containment, hastens the dispersion of the tracer label throughout the container.

Figure 6:
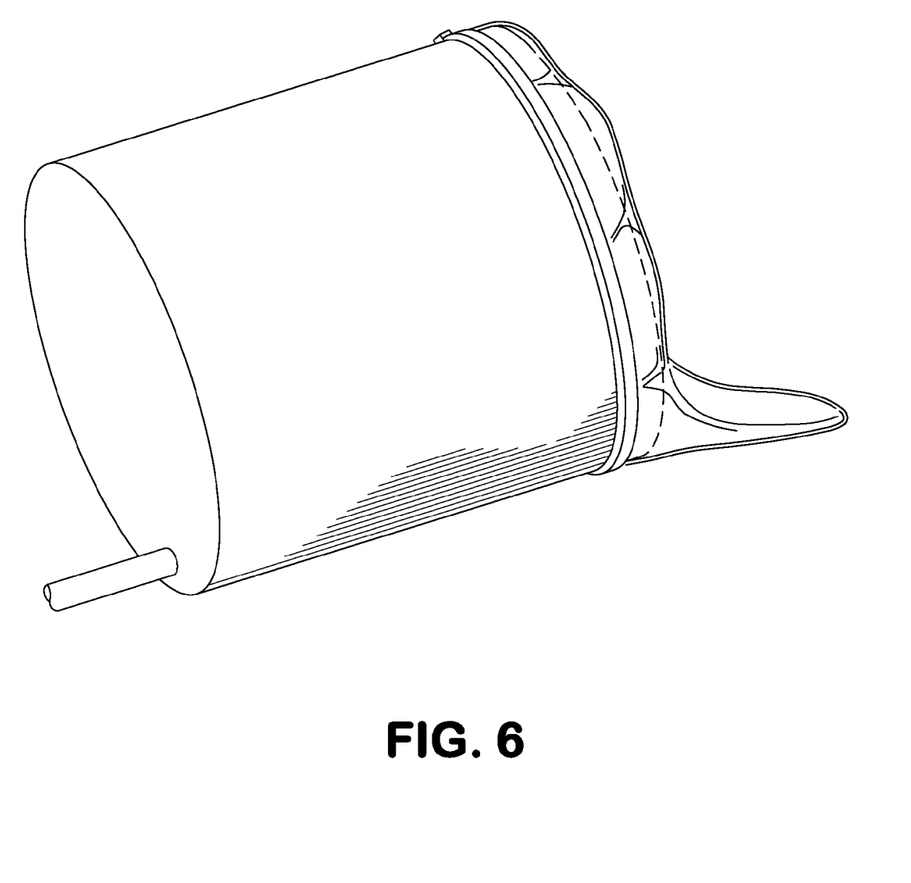
FIG. 6 is a schematic representation showing one embodiment of the present invention showing a collapsible container.

An alternate design for a collapsible container comprises attaching a flexible material, such as, for example, a plastic material, for a barrier to the mouth of a large fixed container, such as, for example, a barrel or tank. The fluid in the barrel may be added and removed through a hole in the bottom. The flexible barrier is drawn into the barrel until it approximately conforms to the shape of the barrel. The barrel with the liner will now function as a bellows, or collapsible container, for the fluid collection device (See FIG. 6).

A variety of tracer chemicals can be used in both liquid and gaseous products. Some useful tracer vapors are liquids at room temperature, as are some gases. Certain tracers are suitable only for gas phase leak detection. Still other tracers are suited only for liquid phase leak detection. The choice of tracer is influenced by cost, rarity, the sensitivity with which it can be detected, convenience of analysis, the mode of transport, the mode of sample collection, the medium through which the tracer is transported and safety of the application. The use of many chemicals as tracer labels is known and any of those described in literature are feasible for use in this application. A non-exhaustive list of useful tracers includes: 1) volatile stable inorganic and organic compounds that are detectable in air, inert gas, water, petroleum fluids and other fluids, such as, for example, sulfur compounds (inorganic), halogenated methanes (organic), combustible hydrocarbons (organic), etc.; 2) radioactive substances that are detectable in air, inert gas, water, petroleum fluids and other fluids, such as, for example, methane, etc.; 3) inert gases that are detectable in air, other inert gases, water, petroleum fluids and other fluids, such as, for example helium, etc.; 4) non-volatile stable inorganic compounds that are detectable in water, petroleum fluids and other fluids, such as, for example, nitrate salts and alkali metal salts, etc.; and 5) non-volatile stable organic compounds that are detectable in water, petroleum fluids and other fluids, such as, for example, dyes, etc.

The primary wall of a double wall vessel can also be tested by adding tracer mixture to the interstice, recycling the mixture to distribute it throughout the interstice, and collecting samples for tracer analysis from the primary containment of the vessel While the invention has been descried in detail with reference to specific embodiments thereof, it will be apparent to one skilled in the field that various changes, modifications and substitutions can be made, and equivalents employed without departing from, and are intended to be included within, the scope of the claims.

We claim:

1. A method for detecting the permeable integrity of a container having a plurality of walls comprising the steps of:
    providing a container having a plurality of chambers with at least a second chamber substantially surrounding a first chamber, each chamber having chamber walls thus creating an interstitial space between the walls of the first and second chambers;
    providing a tracer source in communication with a first or second chamber;
    providing a filling and evacuation system to actively provide and remove tracer, said system in communication with a region selected from the group consisting of: an interstitial space between said first and second chambers, and the first chamber;
    subjecting at least the second chamber to repeated pressure changes during filling and evacuation cycles via the filling and evacuation system;
    sampling the fluid from a region selected from the group consisting of: an interstitial space between said first and second chambers, and the first chamber; and
    evaluating the fluid for the presence of tracer evidencing a leak in a wall from a region selected from the group consisting of: an interstitial space between said first and second chambers, and the first chamber.

2. A method for detecting the permeable integrity of a container having a plurality of walls comprising the steps of:
    providing a container having a plurality of chambers with at least a second chamber substantially surrounding a first chamber, each chamber having chamber walls thus creating an interstitial space between the walls of the first and second chambers;
    providing a tracer source in communication with said first chamber;
    providing a filling and evacuation system in communication with said second chamber;
    directing a flow of tracer from the tracer source into the first chamber;
    inducing a pressure gradient to the system to allow fluid to flow from the first chamber to the second chamber through a leak in first chamber wall;
    subjecting at least the second chamber to repeated pressure changes during filling and evacuation cycles via the filling and evacuation system;
    sampling the fluid from the interstitial space; and
    evaluating the fluid for the presence of tracer evidencing a leak in a wall of the first chamber.

3. The method of claim 2, wherein the evacuation system comprises a pressure/vent cycle.

4. The method of claim 2, further comprising the steps of:
    providing a sampling port and a containment means for fluid evacuated from the second chamber.

5. The method of claim 2, further comprising the steps of:
    directing a fluid flow from the interstitial space to a containment means during an evacuation cycle; and
    redirecting the fluid from the containment means to the interstitial space during a filling cycle.

6. The method of claim 2, wherein the fluid is selected from the group consisting of a liquid, a gas, a vapor, or a mixture thereof.

7. The method of claim 2, wherein the pressure change during filling and evacuation cycles is effected by a pump.

8. The method of claim 2, wherein the second chamber is a made from a material selected from the group consisting of: steel, fiberglass, plastic, and mixtures thereof.

9. The method of claim 2, wherein the second chamber is flexible.

10. The method of claim 2, for detecting a leak in a container wall, said leak having a through flow rate of from about $10^{-7}$ cc/sec to about 1 cc/sec.

11. The method of claim 2, wherein the tracer is a chemical tracer.

12. The method of claim 11, wherein the chemical tracer is selected from the group consisting of: volatile stable inorganic compounds that are detectable in air, inert gas, water, petroleum fluids and other fluids; volatile stable organic compounds that are detectable in air, inert gas, water, petroleum fluids and other fluids; radioactive substances that are detectable in air, inert gas, water, petroleum fluids and other fluids; inert gases that are detectable in air, other inert gases, water, petroleum fluids and other fluids; and non-volatile stable inorganic compounds that are detectable in water, petroleum fluids and other fluids.

13. A method for detecting the permeable integrity of a container having a plurality of walls comprising the steps of:
    providing a container having a plurality of chambers with at least a second chamber substantially surrounding a first chamber, each chamber having chamber walls thus creating an interstitial space between the walls of the first and second chambers;
    providing a tracer source in communication with said second chamber;
    providing a filling and evacuation system in communication with said second chamber;
    directing a flow of tracer from the tracer source into the second chamber;
    inducing a pressure gradient to the system to allow fluid to flow from the second chamber into the first chamber through a leak in the first chamber wall;

subjecting at least the second chamber to repeated pressure changes during filling and evacuation cycles via the filling and evacuation system;

sampling the fluid in the first chamber; and evaluating the fluid for the presence of tracer evidencing a leak in a wall of the first chamber.

14. The method of claim 13, wherein the evacuation system comprises a pressure/vent cycle.

15. The method of claim 13, further comprising the steps of:

providing a sampling port and a containment means for fluid evacuated from the second chamber.

16. The method of claim 13, wherein the pressure change during filling and evacuation cycles is effected by a pump.

17. The method of claim 13, wherein the second chamber is a made from a material selected from the group consisting of: steel, fiberglass, plastic and mixtures thereof.

18. The method of claim 13, wherein the second chamber is flexible.

19. The method of claim 13, for detecting a leak in a container wall, said leak having a through flow rate of from about $10^{-7}$ cc/sec to about 1 cc/sec.

20. The method of claim 13, further comprising the steps of:

directing a fluid flow from the interstitial space to a containment means during an evacuation cycle; and redirecting the fluid from the containment means to the interstitial space during a filling cycle.

21. The method of claim 20, wherein the fluid is selected from the group consisting of a liquid, a gas, a vapor, or a mixture thereof.

22. The method of claim 13, wherein the tracer is a chemical tracer.

23. The method of claim 22, wherein the chemical tracer is selected from the group consisting of: volatile stable inorganic compounds that are detectable in air, inert gas, water, petroleum fluids and other fluids; volatile stable organic compounds that are detectable in air, inert gas, water, petroleum fluids and other fluids; radioactive substances that are detectable in air, inert gas, water, petroleum fluids and other fluids; inert gases that are detectable in air, other inert gases, water, petroleum fluids and other fluids; and non-volatile stable inorganic compounds that are detectable in water, petroleum fluids and other fluids.

24. A method for detecting the permeable integrity of a container having a plurality of walls comprising the steps of:

providing a container having a plurality of chambers with at least a second chamber substantially surrounding a first chamber, each chamber having chamber walls thus creating an interstitial space between the walls of the first and second chambers;

providing a tracer source in communication with said second chamber;

providing a filling and evacuation system in communication with said first or second chamber;

providing a remote detection and sampling means located proximate to the container;

directing a flow of tracer from the tracer source into the second chamber;

subjecting at least the second container to at least one pressure change during filling and evacuation cycles via the filling and evacuation system;

sampling the fluid from the sampling means; and evaluating the fluid from the sampling means for the presence of tracer evidencing a leak in a wall of the second chamber.

25. The method of claim 24, wherein the evacuation system comprises a pressure/vent cycle.

26. The method of claim 24, further comprising the steps of:

providing a sampling port and a containment means for fluid evacuated from the second chamber.

27. The method of claim 24, further comprising the steps of:

directing a fluid flow from the interstitial space to a containment means during an evacuation cycle; and redirecting the fluid from the collection means to the interstitial space during a filling cycle.

28. The method of claim 24, wherein the fluid is selected from the group consisting of a liquid, a gas, a vapor, or a mixture thereof.

29. The method of claim 24, wherein the pressure change during filling and evacuation cycles is effected by a pump.

30. The method of claim 24, for detecting a leak in a container wall, said leak having a through flow rate of from about $10^{-7}$ cc/sec to about 1 cc/sec.

31. The method of claim 24, wherein the tracer is a chemical tracer.

32. The method of claim 31, wherein the chemical tracer is selected from the group consisting of: volatile stable inorganic compounds that are detectable in air, inert gas, water, petroleum fluids and other fluids; volatile stable organic compounds that are detectable in air, inert gas, water, petroleum fluids and other fluids; radioactive substances that are detectable in air, inert gas, water, petroleum fluids and other fluids; inert gases that are detectable in air, other inert gases, water, petroleum fluids and other fluids; and non-volatile stable inorganic compounds that are detectable in water, petroleum fluids and other fluids.

33. An apparatus for detecting the permeable integrity of a container having a plurality of walls comprising:

a container having a plurality of chambers with at least a second chamber substantially surrounding a first chamber, each chamber having chamber walls thus creating interstitial space between the walls of the first and second chambers;

a tracer source in communication with said first chamber, said tracer source capable of delivering a flow of tracer from the tracer source into the first chamber;

a filling and evacuation system in communication with said second chamber, said filling and evacuation system comprising a sampling port and a containment means for fluid evacuated from the second chamber; and wherein at least the second chamber is subjected to repeated pressure changes during filling and evacuation cycles via the filling and evacuation system.

34. The apparatus of claim 33, wherein the fluid is selected from the group consisting of a liquid, a gas, a vapor, or a mixture thereof.

35. The apparatus of claim 33, wherein the pressure change during filling and evacuation cycles is effected by a pump.

36. The apparatus of claim 33, wherein the second chamber is a made from a material selected from the group consisting of: steel, fiberglass, plastic, and mixtures thereof.

37. The apparatus of claim 33, wherein the second chamber is flexible.

38. The apparatus of claim 33, wherein apparatus is capable of detecting a leak in a container wall, said leak having a through flow rate of from about $10^{-7}$ cc/sec to about 1 cc/sec.

39. The apparatus of claim 33, wherein the tracer is a chemical tracer.

40. The apparatus of claim 39, wherein the chemical tracer is selected from the group consisting of: volatile stable inorganic compounds that are detectable in air, inert gas, water, petroleum fluids and other fluids; volatile stable organic compounds that are detectable in air, inert gas, water, petroleum fluids and other fluids; radioactive substances that are detectable in air, inert gas, water, petroleum fluids and other fluids; inert gases that are detectable in air, other inert gases, water, petroleum fluids and other fluids; and non-volatile stable inorganic compounds that are detectable in water, petroleum fluids and other fluids.

41. A system for detecting leaks in a container comprising the apparatus of claim 33.

42. An apparatus for detecting the permeable integrity of a container having a plurality of walls comprising:
- a container having a plurality of chambers with at least a second chamber substantially surrounding a first chamber, each chamber having chamber walls thus creating an interstitial space between the walls of the first and second chambers;
- a tracer source in communication with said second chamber, said tracer source capable of directing a flow of tracer from the tracer source into the second chamber;
- a filling and evacuation system in communication with said second chamber, said filling and evacuation system comprising a containment means for fluid evacuated from the first container; and
- wherein at least the second container is subjected to repeated pressure changes during filling and evacuation cycles via the filling and evacuation system.

43. The apparatus of claim 42, wherein the fluid is selected from the group consisting of a liquid, a gas, a vapor, or a mixture thereof.

44. The apparatus of claim 42, wherein the pressure change during filling and evacuation cycles is effected by a pump.

45. The apparatus of claim 42, wherein the apparatus detects a leak in a container wall, said leak having a through flow rate of from about $10^{-7}$ cc/sec to about 1 cc/sec.

46. The apparatus of claim 42, wherein the tracer is a chemical tracer.

47. The apparatus of claim 46, wherein the chemical tracer is selected from the group consisting of: volatile stable inorganic compounds that are detectable in air, inert gas, water, petroleum fluids and other fluids; volatile stable organic compounds that are detectable in air, inert gas, water, petroleum fluids and other fluids; radioactive substances that are detectable in air, inert gas, water, petroleum fluids and other fluids; inert gases that are detectable in air, other inert gases, water, petroleum fluids and other fluids; and non-volatile stable inorganic compounds that are detectable in water, petroleum fluids and other fluids.

48. A system for detecting leaks in a container comprising the apparatus of claim 42.

49. An apparatus for detecting the permeable integrity of a container having a plurality of walls comprising:
- a container having a plurality of chambers with at least a second chamber substantially surrounding a first chamber, each chamber having chamber walls thus creating an interstitial space between the walls of the first and second chambers;
- a tracer source at least in communication with said second chamber, said tracer source able to release a tracer from the source into the second chamber;
- a filling and evacuation system in communication with at least said second chamber, said filling and evacuation system comprising a containment means for fluid evacuated from the second chamber; and
- a remote detection and sampling means located proximate to the container;
- wherein at least the second chamber is subjected to repeated pressure changes during filling and evacuation cycles via the filling and evacuation system.

50. The apparatus of claim 49, wherein the apparatus detects a leak in a container wall, said leak having a through flow rate of from about $10^{-7}$ cc/sec to about 1 cc/sec.

51. A system for detecting leaks in a container comprising the apparatus of claim 49.

\* \* \* \* \*